United States Patent [19]

Anderson et al.

[11] 4,453,702

[45] Jun. 12, 1984

[54] SLAG CONVEYING ARRANGEMENT

[76] Inventors: Harry E. Anderson, 307 Foxcroft Rd., Pittsburgh, Pa. 15220; Raymond E. Heasley, 38 Silver La., McKees Rocks, Pa. 15136

[21] Appl. No.: 534,616

[22] Filed: Sep. 22, 1983

[51] Int. Cl.$^3$ .............................. B23K 7/02; B23K 7/10
[52] U.S. Cl. .......................................... 266/49; 266/65
[58] Field of Search ..................................... 266/49, 65

[56] References Cited

U.S. PATENT DOCUMENTS

| | | | |
|---|---|---|---|
| 3,526,395 | 9/1970 | Brown | 263/45 |
| 3,969,132 | 7/1976 | Anderson et al. | 266/48 |
| 3,999,744 | 12/1976 | Kotch | 266/48 |
| 4,047,706 | 9/1977 | Tronvold | 266/49 |
| 4,162,060 | 7/1979 | Anderson et al. | 266/49 |
| 4,214,922 | 7/1980 | Ritchie et al. | 266/48 |
| 4,220,318 | 9/1980 | Anderson et al. | 266/49 |

Primary Examiner—W. Stallard
Attorney, Agent, or Firm—Webb, Burden, Robinson & Webb

[57] ABSTRACT

At least one water table adapted for use with a burning machine in combination with a conveyor to remove slag from the water table. The water table has an open top water tank with a dump frame located at the top and burning bars supported on the dump frame to form a metal cutting table. The dump frame may be tilted relative to the water tank and the level of water in the water tank may be varied. The conveyor has an open top trough adjacent to the water table and a conveyor extends substantially throughout the length of the trough to receive slag from the dump frame when the dump frame is tilted. A cover is located at the top of the trough and is pivotally attached to the dump frame on the water table so that it may be tilted. A seal is carried on the exterior of the cover and extends between the cover and the trough to prevent water from passing into the trough when the water level in the water tank is raised to cut metal supported on the burning bars.

12 Claims, 9 Drawing Figures

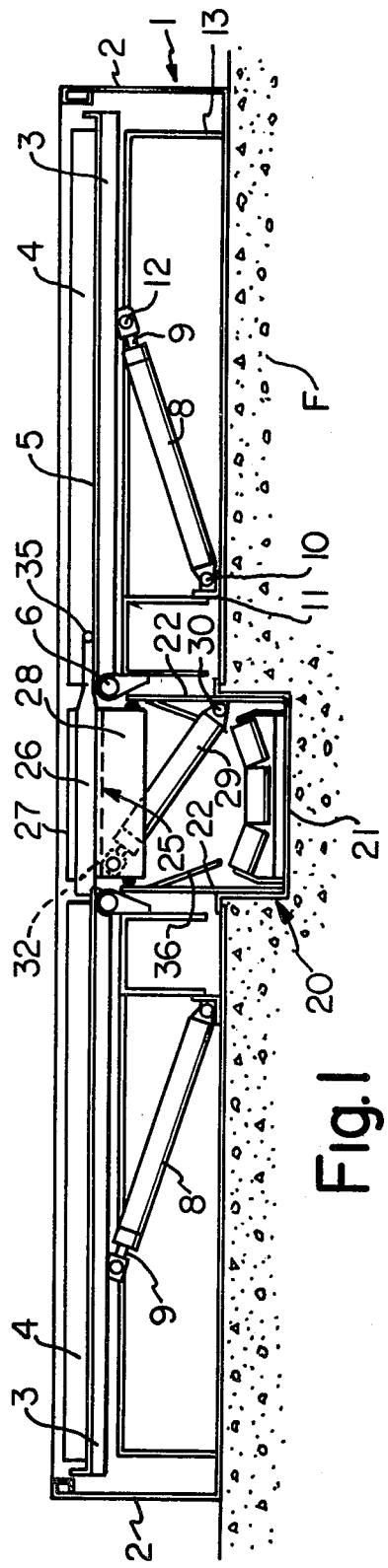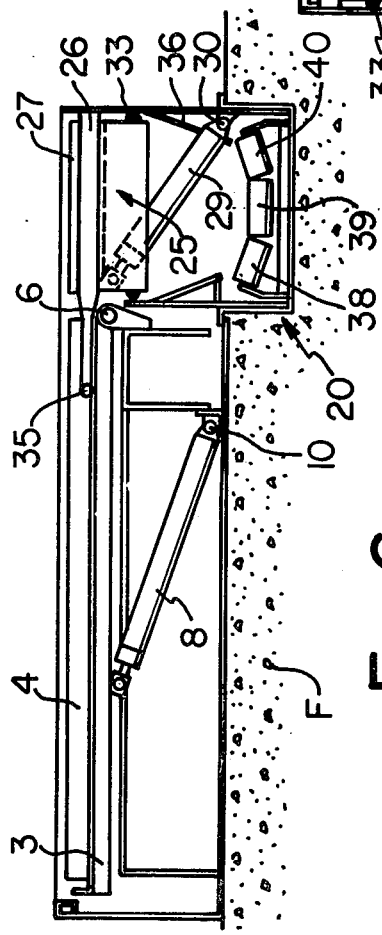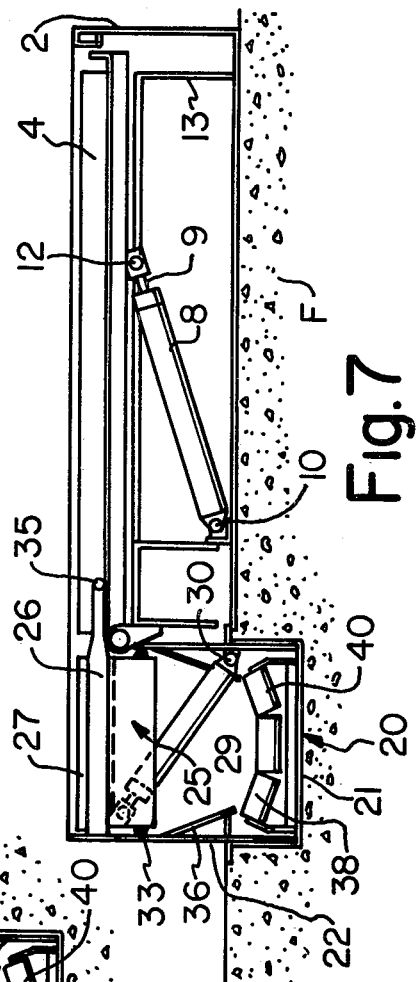

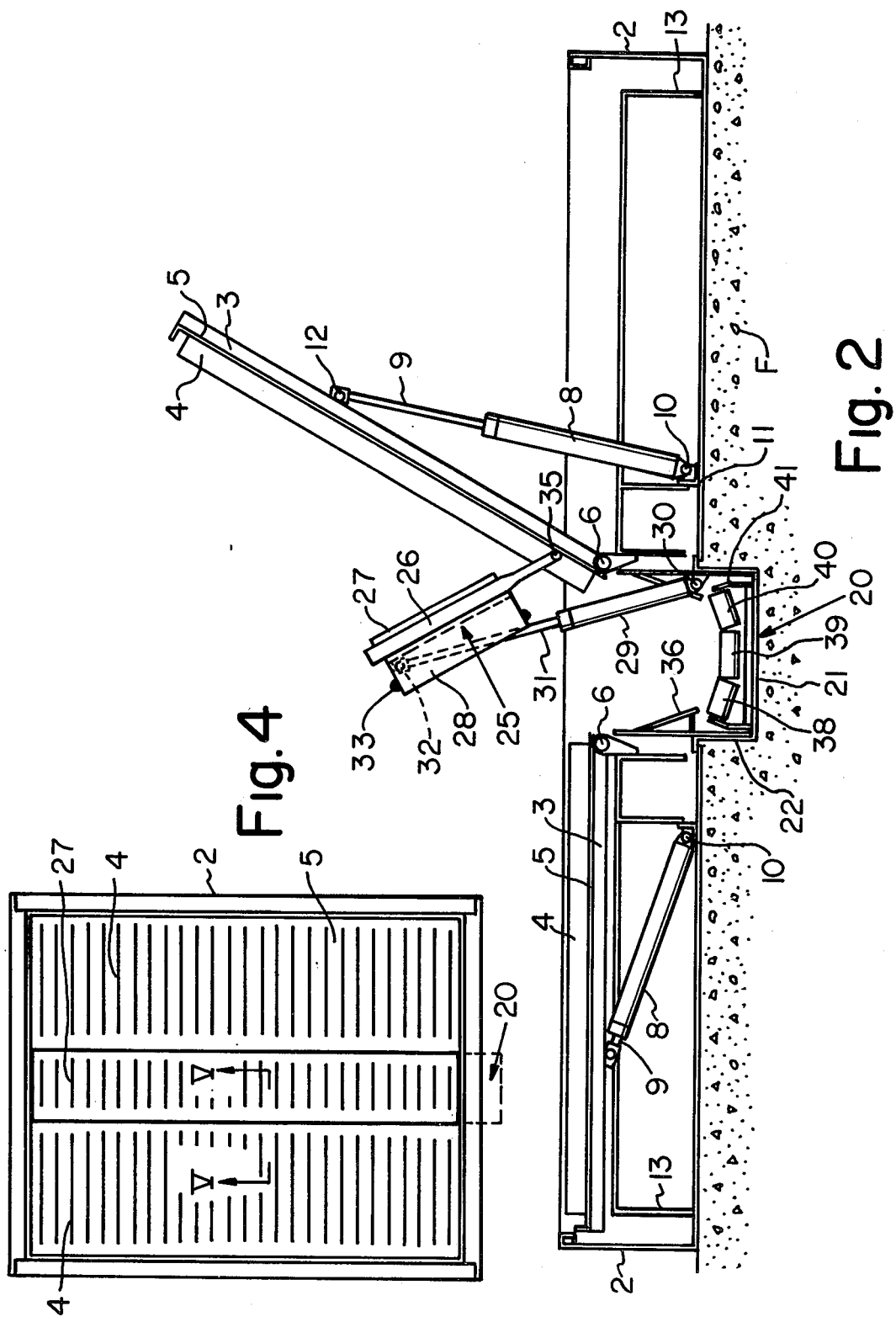

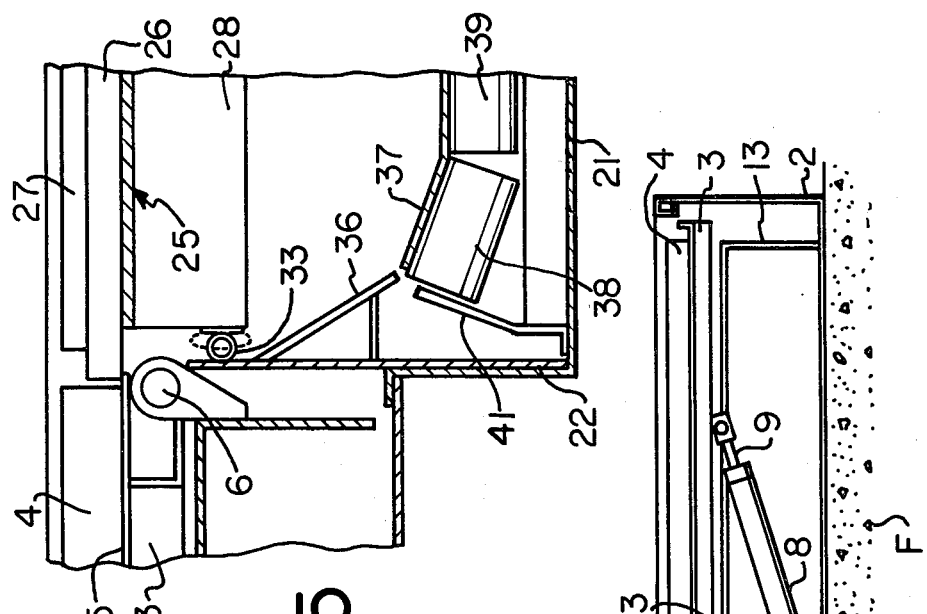
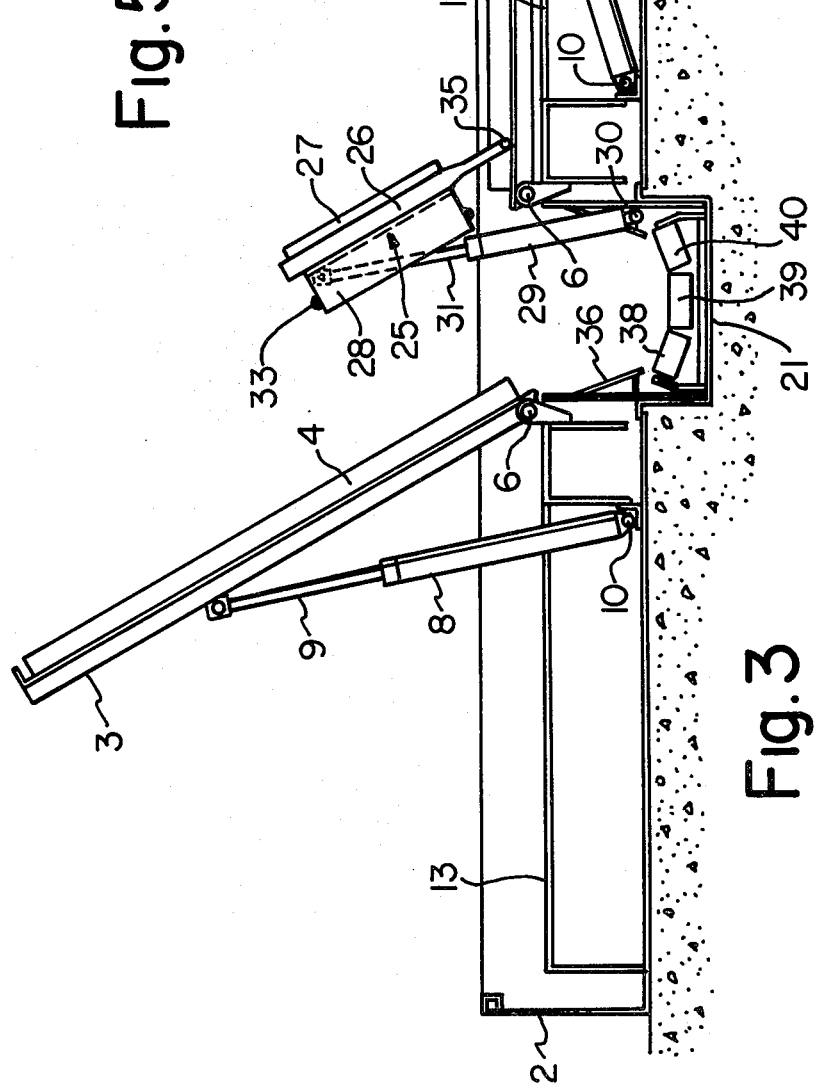

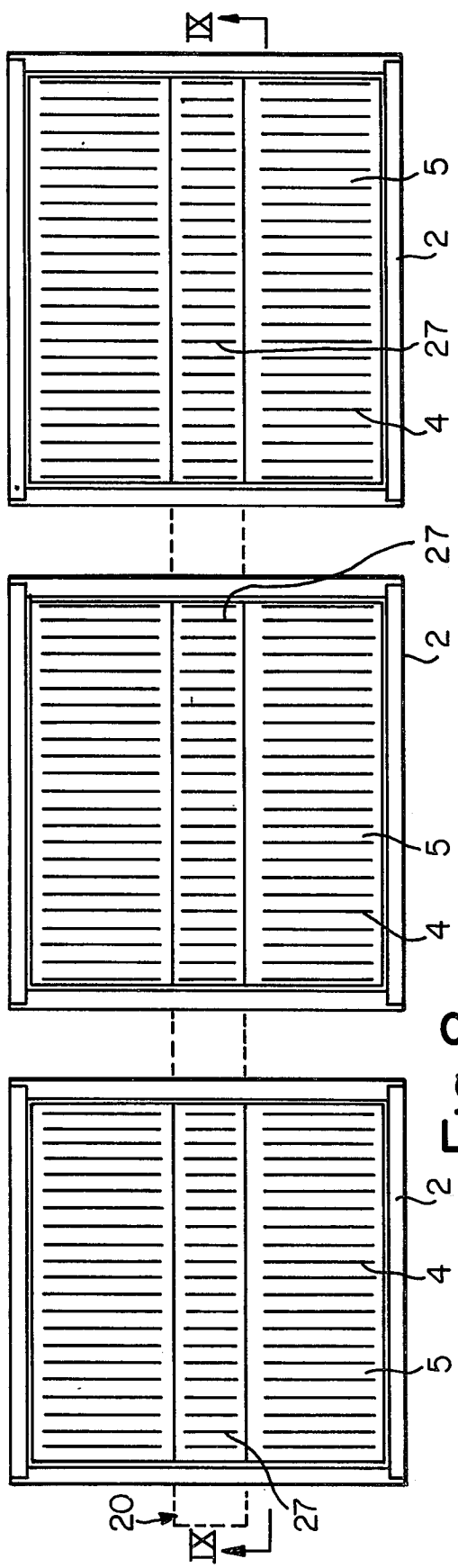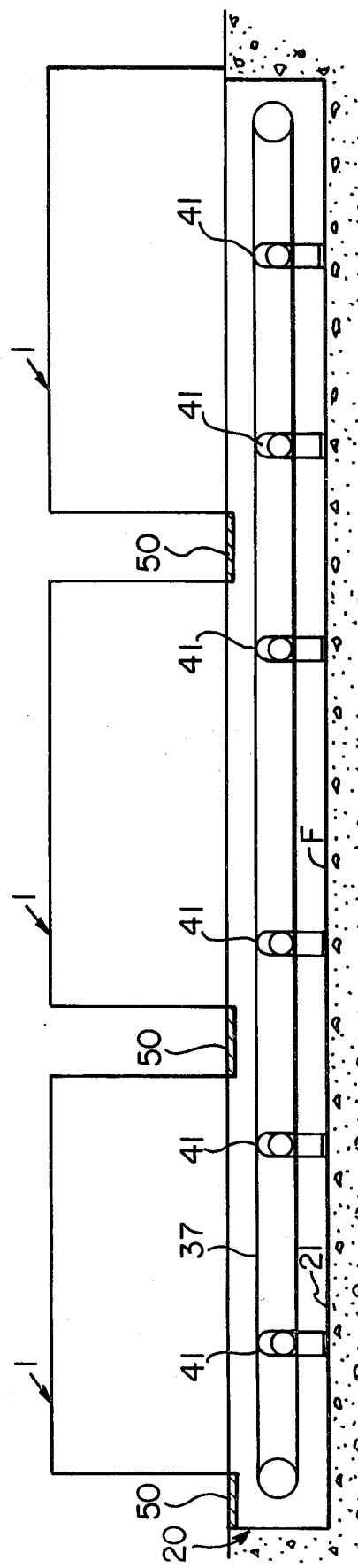

SLAG CONVEYING ARRANGEMENT

BACKGROUND OF THE INVENTION

1. Field of the Invention

This invention relates generally to metal cutting and more particularly to arrangements for conveying slag formed during cutting away from one or more metal cutting tables which may be arranged in different combinations.

2. Description of the Prior Art

Several arrangements for removing slag from a metal cutting station are known in the art. One such arrangement is disclosed in U.S. Pat. No. 4,162,060 wherein the metal is supported on burning bars above a water table during cutting, and after cutting is completed, slag and scrap are transferred from the burning bars into separate collection containers which are subsequently removed by a crane and emptied into a larger container for eventual disposal.

Another arrangement of removing slag from a metal cutting station is disclosed in U.S. Pat. No. 3,526,395 wherein the slag falls onto a downwardly inclined plate, and a stream of water is directed onto the upper end of the inclined plate to wash the slag onto an upwardly inclined conveyor which transports the slag to a collection container.

U.S. Pat. No. 4,047,706 discloses an arrangement for removing slag wherein a slag removal and metal transport conveyor belt is located in a water tank below work support members. The metal shape which is cut from a metal plate drops onto the top of the conveyor belt which has openings therein so that the metal shape is conveyed to one end of the water tank and the molten slag falls through the conveyor belt and rests on the flat bottom of the water tank. The links which form the conveyor belt subsequently drag the slag along the bottom of the water tank to an upwardly inclined conveyor which transports it away from the tank.

Another slag removal arrangement is disclosed in U.S. Pat. No. 4,220,318 which was invented by the inventors of the invention disclosed in the instant application. In that patent, the metal is cut while resting on a conveyor located at the top of a water table after which the conveyor is moved away from the water table to transport the slag away from the metal cutting station to a waste container or other disposal means.

SUMMARY OF THE INVENTION

Briefly, the invention comprises apparatus for cutting metal plates into shapes having desired configurations. During cutting, one or more metal plates are supported on the burning bars of a water table or a plurality of water tables, and the slag generated during cutting is removed from the water table or tables onto a conveyor or a plurality of conveyors preferably located in the floor of the building adjacent to the water tables which transport the scrap away from the water tables for disposal. In one aspect of the invention the water table or tables which support the metal below the cutting mechanism have a water holding tank with means for changing the level of the water in the tank so that the burning table, which is made up of a tiltable dump frame carrying burning bars, is located in the upper portion of the water tank. When cutting takes place, the level of the water is raised to provide for cutting immediately above or slightly beneath the surface of the water to minimize the discharge of noxious fumes created during cutting. The dump frame is pivotally mounted on the water table so that it may be tilted relative to the water tank in order to discharge slag therefrom. The conveyor upon which the slag is dumped extends along the side of the tank and is sealed to prevent water from flowing into the conveyor trough when the water level is raised for burning and the conveyor trough cover is in place. Where a plurality of water tables are located in a side-by-side arrangement, two or more dump frames will discharge onto one conveyor. In another aspect of the invention, the conveyor may be used with other types of water tables which are known in the metal cutting art. The conveyor may be a belt, a chain or the like and may consist of a plurality of individual conveyors in end-to-end relationship.

The invention will be best understood from a consideration of the following description when taken in conjunction with the accompanying drawings wherein like reference numerals identify like elements throughout.

BRIEF DESCRIPTION OF THE DRAWINGS

FIG. 1 is a schematic elevation of a pair of center dump water tables with a conveyor therebetween;

FIG. 2 is a schematic elevation through the arrangement shown in FIG. 1 with one of the water tables in the raised dump position;

FIG. 3 is a schematic elevation through the arrangement shown in FIG. 1 with the other water table in the raised dump position;

FIG. 4 is a schematic plan view of the arrangement shown in FIG. 1;

FIG. 5 is an enlarged section on line V—V of FIG. 4;

FIG. 6 is a schematic elevation of a side dump water table with the conveyor on the right-hand side of the table;

FIG. 7 is a schematic elevation of a side dump water table with the conveyor on the left-hand side of the table;

FIG. 8 is a schematic plan view of a series of center dump water tables with a continuous conveyor therebetween; and FIG. 9 is a schematic section on line IX—IX of FIG. 8.

DESCRIPTION OF THE PREFERRED EMBODIMENTS

The water tables shown in FIGS. 1–7 are generally constructed in accordance with U.S. Pat. No. 4,162,060 without an access frame portion. Each water table 1 has a water tank 2 with a tiltable dump frame 3 in the upper portion. Burning bars 4 are mounted at the upper surface of each dump frame and a substantially imperforate bottom 5 with drain openings is located below bars 4. The tiltable dump frame 3 is pivoted to the table at 6 so that it can be tilted relative to the tank. An angularly positioned piston is located in water tank 2. The piston consists of a cylinder 8 and a rod 9 extending from one end of the cylinder. The closed end of cylinder 8 is pivotally attached at 10 to a horizontal angle 11 fixed to the bottom of water tank 2, and the free end of rod 9 is pivotally attached to the bottom of dump frame 3 at 12. As will be seen in FIGS. 2 and 3, when rod 9 is extended from cylinder 8, the dump frame is tilted about pivot 6 to dump material off the frame into a conveyor trough located along the side of the water table. A substantially closed compartment 13 which communicates with water tank 2 is located within water tank 2. Air may be added to compartment 13 to adjust the water level in the tank in the manner described in U.S. Pat. No. 4,162,060 which is incorporated herein by reference. The water table on the left-hand side of the conveyor trough in FIGS. 1–3 is the same as that on the right-hand side except that it is the opposite hand.

As shown in FIGS. 1–4 of the drawings, a conveyor 20 is located between the water tables 1. The conveyor includes an elongated conveyor trough which is recessed below the surface of the concrete floor F. The conveyor trough has a bottom wall 21 and upstanding sidewalls 22. The conveyor trough is closed at one end, and the other end will discharge into a slag disposal area. The conveyor includes a tiltable cover 25 having a frame 26 with burning bars 27 at the upper surface thereof and a depending skirt portion 28. An angularly positioned piston having a cylinder 29 is pivoted at 30 to a sidewall 22 of the conveyor trough and a rod 31 pivoted to cover frame 26 at 32 is located within the conveyor trough. An inflatable rubber seal 33 extends completely around the exterior surface of the skirt portion 28 of cover 25 so that when expanded by the application of a pressurized fluid, seal 33 will prevent water from leaking into the conveyor trough. When cover 25 is to be raised so that slag can be dumped onto the conveyor belt within the conveyor trough, the fluid pressure in seal 33 is relieved and the seal collapses into the cross section shape shown in dotted lines in FIG. 5 of the drawings. The cover frame 26 includes an elongated member 34 which is pivoted at 35 to the frame 3 of water table 1. The cover pivots at 35 when it is raised by the extension of rod 31 out of cylinder 29. The cover is shown in its raised or tilted position in FIGS. 2 and 3 of the drawings.

As shown in detail in FIG. 5, the conveyor trough is formed along the upper portion of each sidewall 22 with a downwardly depending angular deflector plate 36 to deflect material which passes into the conveyor trough onto conveyor belt 37. The cross section of the conveyor belt is in the shape of a flattened V throughout most of its length because it passes over and is supported on guide rolls 38, 39 and 40 mounted on brackets 41 attached to bottom wall 21 of the conveyor trough. The end rolls at one end of the conveyor are driven rolls and at the other end are idler rolls. As will be appreciated by those skilled in the art, the specific construction of the conveyor arrangement is well known in the art and forms no part of the instant invention.

As shown in FIGS. 8 and 9, a plurality of water tables may be arranged in series on opposite sides of a conveyor. The water tables in FIGS. 8 and 9 are center dump tables as in FIGS. 1–3. Each pair of center dump tables is longitudinally spaced from the adjacent pair of tables, and the single centrally located conveyor 20 extends throughout the length of the arrangement of tables. The conveyor is located below the surface of the floor F, and, as shown in FIG. 9, floor tiles 50 are located between adjacent pairs of water tables and at one end of the conveyor.

The conveyor may be arranged relative to water tables in the manners shown in FIGS. 1, 6, 7 and 8 of the drawings, or if a pair of side dump water tables are located in abutting relationship, a conveyor may be located along each lateral outer edge of the water tables so that the dump frames will discharge onto both conveyors. This is a double side dump arrangement. The arrangement shown in FIGS. 1–3 of the drawings is a double center dump arrangement; the arrangements shown in FIGS. 6 and 7 are in a single side dump and the arrangement shown in FIGS. 8 and 9 is a plurality of water tables in a double center dump arrangement.

In operation prior to metal cutting, a workpiece or a plurality of workpieces is placed on the burning bars of the water table or tables and the trough cover, and the water level is raised in tank 2 until the upper level of the water is close to the metal workpiece or workpieces to be cut. This is accomplished by introducing air into compartment 13 in the water tank above the water level under sufficient pressure, for example, at a pressure at approximately 10 psi, so that the air displaces the water in compartment 13 and raises the water level in water tank 2 to such an extent that the water passes over the sidewalls of the dump frame and passes into both the dump frame and the cover frame so as to rise to a level adjacent to or slightly above the metal workpiece or workpieces. Cutting is then carried out.

When cutting is completed, the air pressure in compartment 13 is reduced which allows the water to flow back into compartment 13 from water tank 2 to its initial level. The lowering of the water level permits complete acess to the inside of the individual dump frames and the cover frame. When the water has drained from the frames, seal 33 is deflated and conveyor cover 25 is raised by extending rod 31 from cylinder 29. The dump frame or frames are tilted by extending rods 9 from cylinders 8, and the waste is emptied from the dumping frames into the conveyor trough onto conveyor belt 37 which transports it to a disposal area.

Having described preferred embodiments of the invention, it to be understood that the invention may otherwise be embodied within the scope of the appended claims.

We claim:

1. In combination, at least one water table adapted for use with a burning machine and a slag removal conveyor adjacent to and operative with said water table to remove slag therefrom, said water table comprising an open top water tank, dump frame means located in the open top of said water tank, burning bars supported on said dump frame means adapted to support at least one metal workpiece to be cut, means for tilting said dump frame means relative to said water tank and means for varying the level of water in said water tank, said slag removal conveyor comprising a continuous conveyor trough located adjacent to said water table, said conveyor trough including spaced sidewalls, end walls and a bottom wall, conveyor means located within and extending substantially throughout the length of said continuous conveyor trough adapted to receive slag from said dump frame means, a cover means located at the top of said conveyor trough and extending between said sidewalls and said end walls of said conveyor trough, means pivotally attaching said cover means to said dump frame means, means to tilt said cover means to provide access to said conveyor means within said conveyor trough, and seal means on said cover means extending between said cover means and said sidewalls and end walls of said conveyor trough, whereby said seal means prevent water from passing into said conveyor trough when the water level is raised for cutting metal workpieces located on said burning bars.

2. The combination set forth in claim 1 wherein said seal means is an inflatable member extending completely around the perimeter of said cover means.

3. The combination set forth in claim 1 wherein said conveyor trough includes a depending angular deflector attached to each of said sidewalls of said trough to direct slag passing from said dump frame means onto said conveyor means in said conveyor trough.

4. The combination set forth in claim 1 wherein said cover means includes a frame, burning bars on the upper surface of said frame adapted to support a metal workpiece to be cut and a skirt portion depending from the bottom of said frame into said conveyor trough, said seal means being attached to said depending skirt portion.

5. The combination set forth in claim 4 wherein said seal mans is a hollow resilient inflatable member attached to the outer surface of said depending skirt portion of said cover means.

6. The combination set forth in claim 1 including a plurality of water tables adapted for use with burning machines, each of said water tables having a center dump frame, at least one of said plurality of water tables located on one side of said conveyor trough and at least another of said plurality of water tables located on the opposite side of said conveyor trough.

7. The combination set forth in claim 1 including a plurality of pairs of water tables, each of said water tables having a center dump frame, said conveyor trough being located between said pairs of water tables wherein all of said center dump frames may be tilted toward said conveyor trough to deposit slag upon said conveyor means within said conveyor trough so said conveyor means removes slag from all of said plurality of water tables.

8. The combination set forth in claim 1 wherein said means for tilting said cover means is a cylinder having one end pivotally attached to a sidewall of said conveyor trough and a rod extending from the free end of said cylinder and pivotally attached to said cover means, whereby extension of said rod from said cylinder tilts said cover means.

9. The combination set forth in claim 1 wherein said means for tilting said dump frame means relative to said water tank is a cylinder having one end pivotally attached to said water tank and a rod extending from the free end of said cylinder and pivotally attached to said dump frame means, whereby extension of said rod from said cylinder tilts said dump frame means about said pivotal connection between said dump frame means and said water tank.

10. The combination set forth in claim 1 wherein said means for varying the level of water in said water tank comprises a compartment within said water tank in fluid communication with said water tank and means for introducing into and exhausting a gas from said compartment above the level of water located therein, whereby said water level is varied by the introduction and exhaustion of gas from said compartment.

11. The combination set forth in claim 1 including a plurality of water tables adajcent to said conveyor trough.

12. The combination set forth in claim 11 wherein said water tables are longitudinlly aligned and all of said water tables are located on one side of said trough.

* * * * *